United States Patent [19]

Baratelli

[11] Patent Number: 5,015,087

[45] Date of Patent: May 14, 1991

[54] PINCE-NEZ EYEGLASSES

[75] Inventor: Charles Baratelli, Fort Lauderdale, Fla.

[73] Assignee: DBS Optical, Inc., Ft. Lauderdale, Fla.

[21] Appl. No.: 516,515

[22] Filed: Apr. 30, 1990

[51] Int. Cl.⁵ .............................................. G02C 1/00
[52] U.S. Cl. .................................................. 351/65
[58] Field of Search ...................... 351/64, 65, 68, 110, 351/158

[56] References Cited

U.S. PATENT DOCUMENTS 1,167,953 1/1916 Uhlemann .............................. 351/65
3,020,552 2/1962 Coon ...................................... 351/65

Primary Examiner—Paul M. Dzierzynski
Attorney, Agent, or Firm—Malin, Haley, McHale, DiMaggio & Crosby

[57] ABSTRACT

A Pince-Nez style eyeglass is provided, manufactured in one piece of lightweight plastic, and having a matte finish on all surfaces of the eyeglasses except the front and back surfaces of the lenses to reduce refraction and "piping" of light off of the non-functional surfaces of the eyeglasses into the eye of the user.

12 Claims, 1 Drawing Sheet

PINCE-NEZ EYEGLASSES

BACKGROUND OF THE INVENTION

1. Field of the Invention

The subject matter of the invention relates to eyeglasses and more particularly to miniature reading glasses that rest securely on the wearer's nose in the Pince-Nez style.

2. Description of Related Art

Many people today have vision problems that require connection in order to lead normal lives. To this end the eyeglass and contact lens industry has developed. Within this industry is a wide variety of glasses types and styles. From as early as the 1300's, glasses were made that clamped on the nose. This was done by rotating the lenses around a pivot on the bridge between the two lenses into firm contact with the nose. Beginning in the 1840's, the Pince-Nez ("nose-pinchers" in French) eyeglasses were first worn. These glasses consisted of lenses, a metal rim around the lenses, cork nose guards and a spring bridge biasing of the lenses to clamp the nose. Later, in 1890, rimless eyeglasses were made by drilling holes in the glass lenses to hold the nose bridge and the temples to the lenses. The "rimless" innovation was added to the Pince-Nez eyeglasses to form a rimless Pince-Nez, although the metal spring bridge and nose guards remained.

In 1916, William R. Uhlemann, took the next step in Pince-Nez eyeglasses by inventing an "eyeglass bridge or arch" formed of a vitreous or transparent vitreous material such as glass, that is integrally connected to the eyeglass lenses, which resulted in the grant of U.S. Pat. No. 1,167,953. Joseph Pearson of England in 1938 secured British Patent No. 490,197 for his invention of spectacles made in one piece of "artificial molded material that is not glass" and comprising two lenses connected together by a connecting piece of the same material as that used for the lenses.

The problem with one piece eyeglasses such as those described by the PEARSON patent is that a large amount of reflected or refracted light from the edges of the lenses, the nosepiece, and the bridge comes into the wearer's eyes causing annoyance and possibly dangerous distraction. This phenomena, called "piping" creates prismatic disturbances which interfere with the visual characteristics of the lenses to reduce optical clarity. It is therefore highly desirable to provide a one-piece Pince-Nez eyeglass that avoids these reflections and refractions.

SUMMARY OF THE INVENTION

It is therefore an object of the invention to provide an eyeglass assembly which is manufactured in one piece.

It is also an object of the invention to provide an eyeglass assembly made of the new lightweight plastics.

It is a further object of the invention to provide a frameless eyeglass assembly.

It is another object of the invention to provide a Pince-Nez eyeglass assembly that is flexible at the bridge so as to mildly pinch the nose.

Yet another object of the invention is to reduce or remove annoying and distracting reflections and refractions from the edge of the lenses, the nosepiece, and the bridge.

Finally, it is an object of the invention to combine the aforementioned objectives of the invention into an eyeglass assembly that is easy and inexpensive to manufacture.

In accordance with these and other objects which will be apparent hereinafter, the invention will now be described with particular reference to the accompanying drawings.

DETAILED DESCRIPTION OF THE INVENTION

Figure 1:
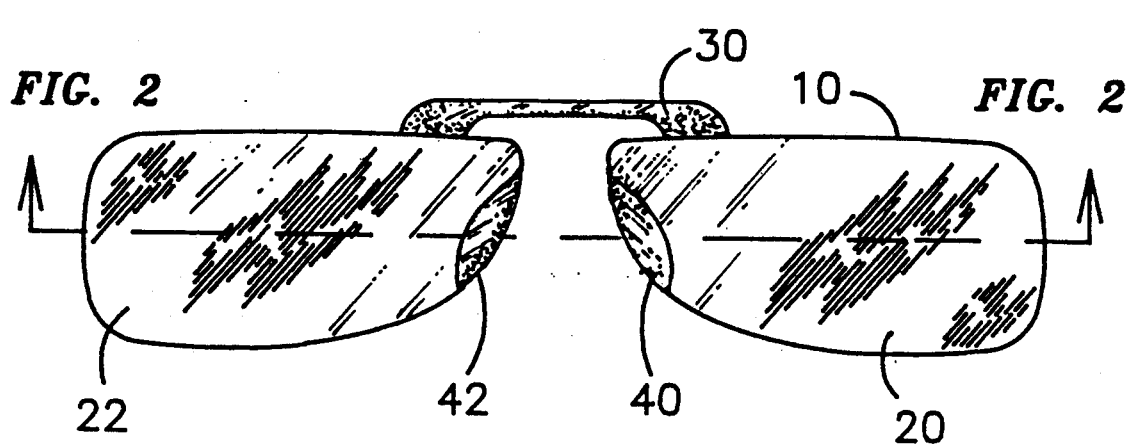
FIG. 1 is a front view of an embodiment of the invention.

In FIG. 1 is shown the eyeglass assembly 10. The assembly 10 comprises two lenses 20, 22 connected by a bridge 30, and further having two nose pieces 40, 42.

The entire assembly 10 is manufactured in one piece of the same material such as a lightweight plastic by processes well known in the plastic industry such as injection.

The shape of the assembly 10 can be determined by the construction of molds to receive the injected plastic material. In the preferred embodiment of the invention, the surface of the bridge 30 and nose pieces 40, 42 as well as the surface of the edge of the lenses 20, 22 is made into a matte finish. This can be done by not polishing the inside of the molds used in the injection process at these points as is ordinarily done. The rough surface on the molds produces the reverse rough matte surface on the bridge 30, nose pieces 40, 42, and around the edges of the lenses 20, 22. This matte surface scatters and disperses any light impinging on it, thus eliminating refracted or reflected light from these pieces that might enter the eye of the user. The lenses 20, 22 are molded in a thickness and shape that will provide polishing to a smooth finish on the operational surfaces of the lenses.

In another embodiment of the invention, the matted surface can be achieved by physically "roughing up" the surface of an otherwise smooth bridge 30, nose pieces 40, 42, and edge of the lenses 20, 22. This "roughing up" can be accomplished by sanding the surfaces with fine grit, by using a grinding wheel with fine grit, or any other similar process.

Figure 2:
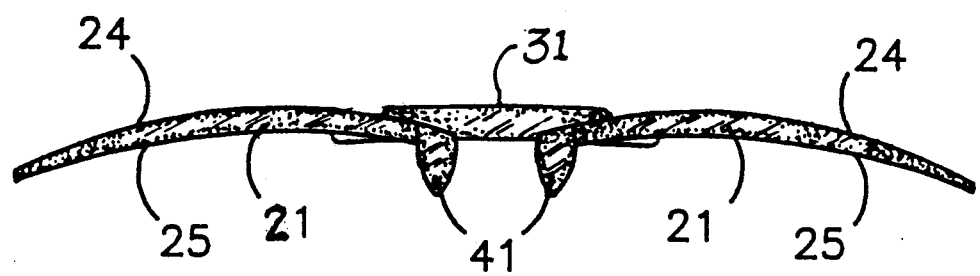
FIG. 2 is a bottom view of the embodiment shown in FIG. 1.

FIG. 2 shows the underside of the embodiment of the invention in FIG. 1. From this view can be seen the three different surfaces that have the matte finish. The points marked 21, 31 and 41 correspond to matte surfaces on the edges of the lenses 20, 22, the bridge 30, and the nose pieces 40, 42, respectively. Combining FIGS. 1 and 2, it is seen that the only surface on the eyeglasses that is not covered with a matte finish is the front and back surfaces 24, 25 respectively of the lenses 20, 22. Stated another way, every surface of the eyeglasses, including edges of the lenses 20, 22, nose pieces 40, 42, and bridge 30, except the front and back surfaces 24, 25 of lenses 20, 22 is covered with a matte finish to eliminate the "piping" problem of the prior art devices. Therefore, the only light impinging on the assembly 10 that will find its way into the user's eyes is the light passing through the smooth surfaces 24, 25 of the lenses 20, 22. All other light impinging upon the assembly 10 is scattered and dispersed off of the matte surface of the remaining pieces.

Figure 3:
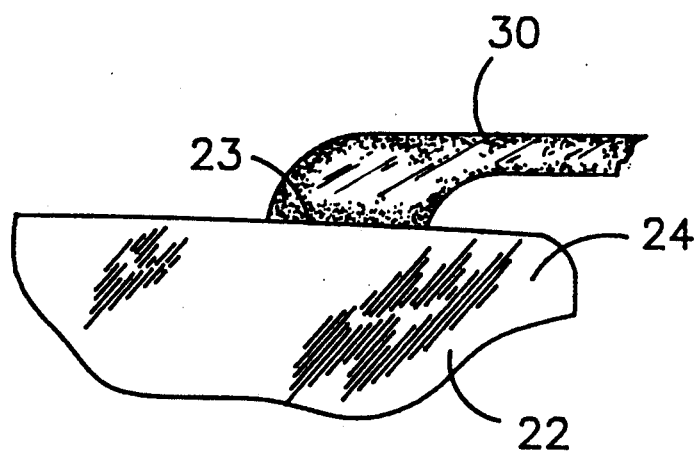
FIG. 3 is a close-up view of the connection of the bridge to one of the lenses.

As can be seen in FIG. 3, the bridge 30 is integrally connected to lens 22 at 23. Although FIG. 3 shows the connection of the bridge 30 to the lens 22, a mirror image situation presents itself at the connection of the bridge 30 to the lens 20. Because the bridge 30 in the preferred embodiment is made of a rigid, semi-flexible material such as plastic, as is the entire unit, the bridge 30 will have a degree of spring in it that will allow it to return to its original position when moved therefrom. This spring quality aids in keeping the assembly 10 on the wearer's nose. The nose pieces 40, 42 are manufactured a distance apart from each other that is slightly narrower than the user's nose.

To wear the eyeglasses, the user separates the nose pieces 40, 42 from each other, thus bending the bridge 30 from its original position, and then places the assembly 10 on the user's nose. The user's nose keeps the nose pieces 40, 42 from returning to their normal separation and a constant displacement is transmitted to the bridge 30. The displacement of the bridge 30 causes a corresponding force by the bridge 30 to squeeze the nose pieces 40, 42 into their normal position. This squeezing force mildly pinches the user's nose between the nose pieces 40, 42 and aids in holding the assembly 10 on the user's face.

As described above, the instant invention is one piece Pince-Nez eyeglasses having a matte finish around the edges of the lenses and on the surface of the bridge and nosepieces. Because of the one piece construction of the eyeglasses, the eyeglasses have no need for a frame around the lenses. In addition, because of the Pince-Nez style, no temples are needed. Because no frame or temples are needed, the weight of the eyeglasses and cost and complication of construction are reduced. The result is excellent eyeglasses that are simple, lightweight, and inexpensive.

Although the preferred embodiment of the invention is made of plastic, it is within the spirit of the invention to be made of a semi-rigid glass or any other similar material.

While there has been described above the principles of this invention in connection with specific embodiments, it is to be clearly understood that this description is made only by way of example and not as a limitation to the scope of the invention.

What is claimed is:

1. One piece integral, frameless eyeglasses comprising:
   (a) a first and second lens, disposed in a common plane, each of said lenses having at least one edge; and
   (b) a flexible and resilient bridge integrally connecting said first and said second lens, said bridge separating said first and second lenses, when said bridge is unstressed, by a distance slightly less than the width of a user's nose where said eyeglasses are to be positioned, said bridge biasing said lenses toward each other when said lenses are stressed and separated from each other;
   whereby said lenses are biased to mildly squeeze the nose of the user when first separated from each other and then released upon a user's nose, thus securing said eyeglasses in place without the necessity of any additional support or external appendage.

2. The eyeglasses of claim 1 wherein said edge of each of said first and said second lenses has a matte finish.

3. The eyeglasses of claim 1 wherein said bridge has a matte finish.

4. The eyeglasses of claim 1 wherein said bridge, said first and said second lens are manufactured of the same material.

5. The eyeglasses of claim 4 wherein said material is plastic.

6. The eyeglasses of claim 4 wherein said material is semi-rigid glass.

7. The eyeglasses of claim 4 further comprising at least one nose piece disposed about said first and second lenses and wherein said nose piece is manufactured of the same material as said bridge, said first lens and said second lens.

8. The eyeglasses of claim 1 further comprising at least one nose piece disposed about said first and second lenses, beneath said bridge.

9. The eyeglasses of claim 8 wherein said nosepiece has a matte finish.

10. The eyeglasses of claim 8 wherein said nose piece is made of semi-rigid plastic.

11. The eyeglasses of claim 8 wherein said nose piece is made of semi-rigid glass.

12. One piece integral, frameless eyeglasses comprising:
   (a) a first and second lens, disposed in a common plane, each of said lenses having at least one edge;
   (b) a flexible and resilient bridge integrally connecting said first and said second lens, said bridge separating said first and second lenses, when said bridge is unstressed, by a distance slightly less than the width of a user's nose where said eyeglasses are to be positioned, said bridge biasing said lenses toward each other when said lenses are stressed and separated from each other;
   (c) at least one nose piece disposed between about said first and second lenses beneath said bridge;
   whereby said lenses are biased to mildly squeeze the nose of the user when first separated from each other and then released upon a user's nose, thus securing said eyeglasses in place; and
   wherein said first and second lenses, bridge, and nose piece are made of the same material; and wherein said edge of said first and second lenses, said bridge, and said nose piece have a matte finish.

* * * * *

UNITED STATES PATENT AND TRADEMARK OFFICE
CERTIFICATE OF CORRECTION

PATENT NO. : 5,015,087

DATED : May 14, 1991

INVENTOR(S) : Charles Baratelli

It is certified that error appears in the above-identified patent and that said Letters Patent is hereby corrected as shown below:

Column 1, line 12 delete the word "CONNECTION", and insert -- correction--.

Signed and Sealed this

Twenty-ninth Day of September, 1992

Attest:

DOUGLAS B. COMER

Attesting Officer

Acting Commissioner of Patents and Trademarks